No. 772,535. PATENTED OCT. 18, 1904.
E. A. RIX.
ENGINE VALVE GEAR.
APPLICATION FILED JULY 1, 1903.
NO MODEL. 2 SHEETS—SHEET 1.
Fig. 1.
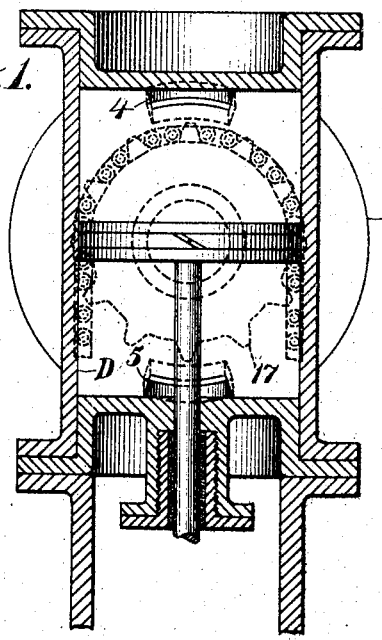
Fig. 6.
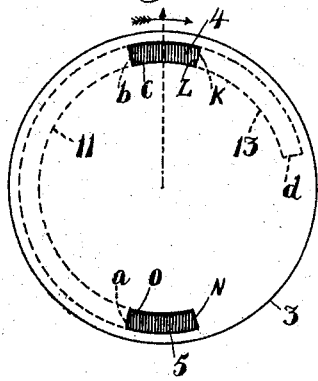
Fig. 7.
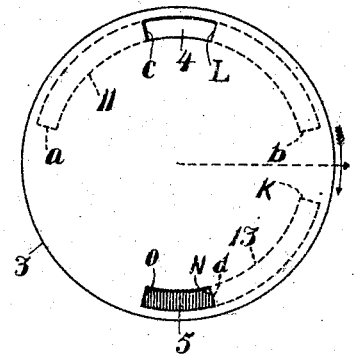
Fig. 8.
Fig. 9.
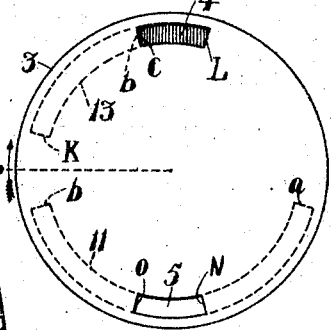
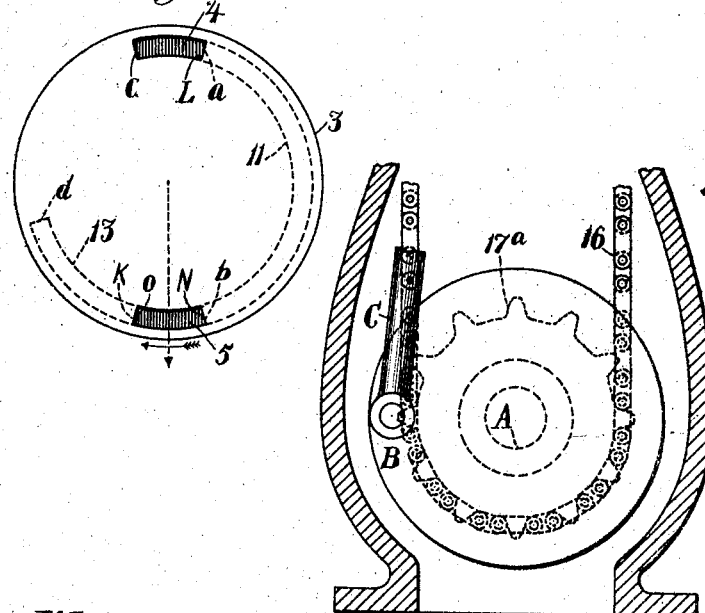
Witnesses:
F. C. Fliedner
Inventor,
Edward A. Rix
By Geo. H. Strong.
Atty

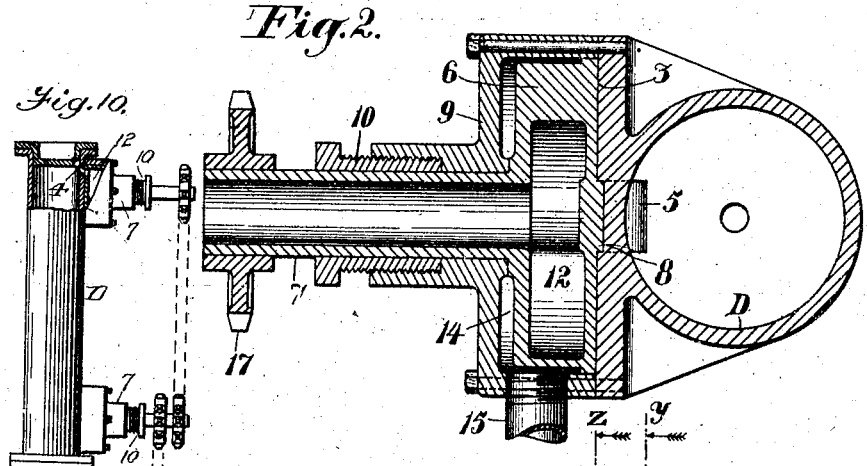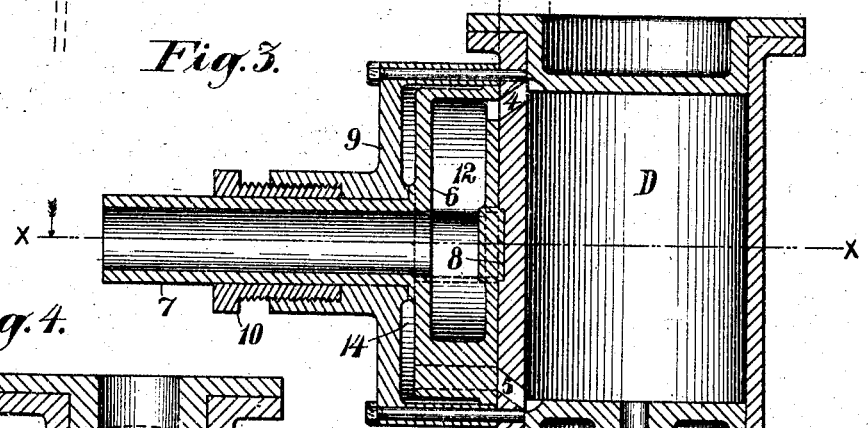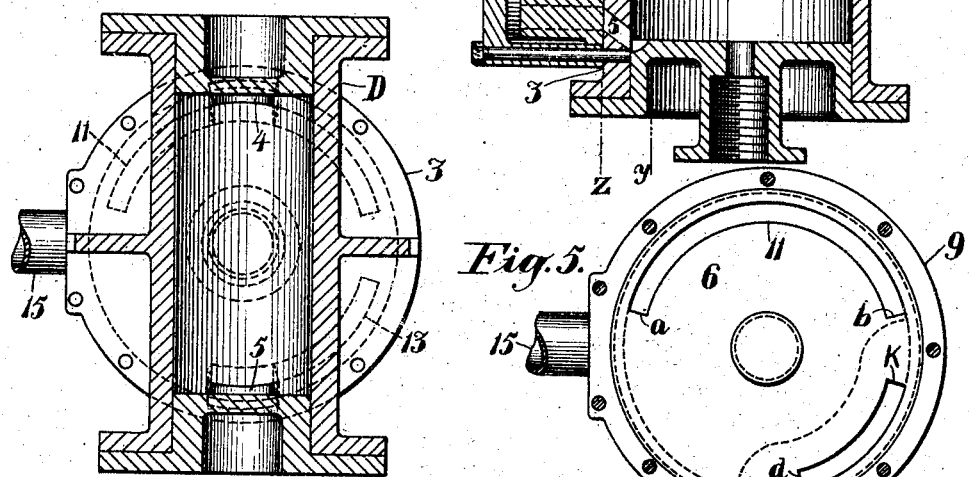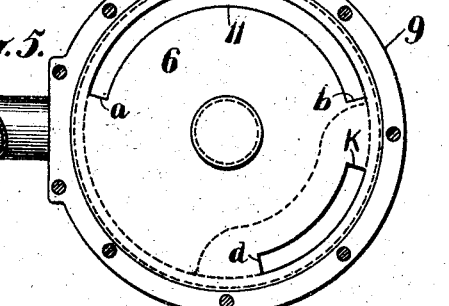

No. 772,535. Patented October 18, 1904.

UNITED STATES PATENT OFFICE.

EDWARD A. RIX, OF SAN FRANCISCO, CALIFORNIA.

ENGINE VALVE-GEAR.

SPECIFICATION forming part of Letters Patent No. 772,535, dated October 18, 1904.

Application filed July 1, 1903. Serial No. 163,837. (No model.)

*To all whom it may concern:*

Be it known that I, EDWARD A. RIX, a citizen of the United States, residing in the city and county of San Francisco, State of California, have invented an Improvement in Engine Valve-Gears; and I hereby declare the following to be a full, clear, and exact description of the same.

My invention relates to a new and improved valve-motion for use in reciprocating engines that compress or expand an elastic fluid.

It consists of one or more circular valve-seats having ports at opposite sides of the center connecting with opposite ends of a cylinder and a rotatable guided valve fitting each seat and having inlet and outlet ports which are successively brought to register with the ports of the valve-seat and which ports remain fully open the longest possible time. Supply and exhaust passages connect with the ports controlled by the valve.

My invention also comprises details of construction all of which will be more fully explained by reference to the accompanying drawings, in which—

Figure 1 is a sectional elevation of an engine, showing a valve driving-gear. Fig. 2 is a section through $x$ $x$ of Fig. 3. Fig. 3 is a section at right angles with Fig. 1. Fig. 4 is a section through $y$ $y$ of Fig. 3. Fig. 5 is a section through $z$ $z$ of Fig. 3. Figs. 6, 7, 8, 9 are diagrams showing various relative positions of the ports. Fig. 10 is a modification, of reduced size, to be hereinafter referred to.

The ordinary type of slide-valve movement employed in such engines is driven from an eccentric or drag link or from a reduced motion taken from the connecting-rod or crosshead or piston-rod, so that the valve reciprocates a small distance compared to the motion of the piston, the result being that the ports are fully open but an instant and are always either opening or closing, which has a disturbing effect upon the elastic fluid passing through them.

In the ordinary reciprocating slide-valve motion limitations are soon reached in the matter of compression or expansion because the backward movement harmonizes with the forward movement, and an early cut-off, for example, means an early exhaust-closure, and when half cut-off is used the limit of the ordinary slide-valve is reached. Moreover, a high rotative speed is undesirable in slide-valve engines, because of the continual wire-drawing effect of the valve.

My new slide-valve, however, has none of the limitations of the ordinary slide-valve. The valve movement instead of being from one-fourth to one-eighth of the piston-stroke is about three times the piston-stroke, or a difference of from twelve to twenty-four times the movement of an ordinary slide-valve. The ports instead of full open for an instant are open during substantially the entire stroke of the valve. The compression or expansion is unlimited instead of limited, and the speed may be great. Moreover, the movement is continuous and in one direction and at a constant angular velocity.

My drawings show an apparatus for the compression of gases and may be described as follows:

A is the shaft; B, the crank; C, the connecting-rod, and D the cylinder with heads, which are similar to ordinary engines. On the side of the cylinder is a circular face 3, which is planed off parallel to the axis of the engine and the surface scraped. Two large ports 4 and 5 connect to opposite ends of the cylinder-bore and permit passage of the gases both before and after compression. Finished and scraped to the face 3 is a rotating valve 6, that is guided at the center by the hollow tube 7 on the outer end and by the step fitting in the recess 8 on the inner end. The whole is inclosed in a case 9, which is bolted to the surface 3 and has a stuffing-box 10 to pack the hollow tube 7. The valve has an inlet-port 11, reaching from $a$ to $b$ and which is connected to the source of the elastic-fluid supply through the passage 12 and the hollow tube 7.

The valve 6 has a discharge-passage 13, which connects with the space 14 within the valve-casing, which has an outlet 15 to conduct the compressed fluids wherever may be desired. Rotative motion is given the valve by means of the chain 16 and equal gears 17 $17^a$, connecting the valve shaft or tube to the crank-shaft. The valve rotation and the crank-shaft rotation must be exactly alike. There are many other ways of reproducing the crank-motion on the valve-shaft; but the chain method appears to be the most desirable. Likewise in engines of long stroke there may be a valve at each end of the cylinder, as shown in Fig. 10, instead of one, as shown, and the valve or valves need not necessarily be placed on the cylinder sides. They may be at any convenient angle instead of parallel to the axis of the engine. The form shown, however, is simplest and best for short-stroke engines. The nature of the valve-surfaces is not material, provided a proper tight contact is made and the material is such as will not cut or wear unduly. Neither is it material that the inlet and outlet ports in the valve should be constructed as shown. They may be reversed and the fluids discharged through the hollow valve-shaft and admitted into the valve-casing through the passage 15. In such case the relative dimensions and positions of the valve-openings must be changed accordingly.

If the valve 6 be now superimposed on the face 3 and rotated in the direction of the arrow (it will operate equally well rotating in the opposite direction if the ports be changed accordingly) and the edge $b$ of the port 11 be line and line with the edge $c$ of the cylinder-port 4, the line $a$ will cover the line $o$ of the port 5. When the piston begins a downward stroke, the port 11 is opened, and the fluid will be drawn into the cylinder through 4 and the port 5 will be closed. The port 4 will be quickly opened fully and will remain so until at the end of the stroke, when the line $a$ has closed the port 4 at the line L. The line $b$ will then have reached the line N, and the cylinder-port 5 begin to open when the piston begins to make its upward stroke, and when $b$ has reached $c$ again the three hundred and sixty degrees has been completed and fluid admitted throughout the whole stroke to both ends of the cylinder.

For the compressing stroke we have as follows: When the piston begins its downward movement, the line K of the discharge-port 13 has cleared the line L of the cylinder-port 4, and the fluid beneath the piston is confined and being compressed, and this will go on until the line $d$ of the discharge-port 13 passes the line N of the port 5. The fluid will then be forced from the cylinder through port 5 and through 13 until at the end of the stroke the line K coincides with the line O and compression is about to take place on the upstroke. The same operation then takes place for the upper port 4 until the cycle is complete.

It is evident that the line $d$ of the port 13 is a fixture; but the port may be lengthened or shortened at the opposite end K as the discharge pressure desired is diminished or increased, and this pressure may be varied from zero to infinity, which cannot be done with any form of single reciprocating slide-valve.

Any one valve is generally fixed for a particular pressure; but a number of valves may be supplied giving various pressures, or the length of the port 13 may be varied by a simple adjusting mechanism, so that one valve may act for several pressures.

By reversing the movement of the compressed gases within the apparatus the engine will become an elastic-fluid motor and the fluid be expanded as desired, and no mechanical change is necessary to change the character of the engine. By this character of valve long cylinder-ports are avoided, thus avoiding considerable clearance.

It can readily be seen that for high speed the large ports and long intervals of full opening make an ideal construction. An advantage of this construction lies in the reduced wear of the valve faces and seat because of the continuous movement in one direction. This produces a continuous "floating contact," which is characterized by the riding of the valve upon a thin film of fluid lying between the two faces. This effect is lost in reciprocating valves which come to a state of rest at the end of each reciprocation and in which there is greater wear at the ends than on other parts.

The apparatus herein described is especially designed for elastic-fluid-compressing engines, especially for that class known as "air-compressors," and the relative length and disposition of the valve-ports are important, inasmuch as the inlet-valve is made of such length that it remains open during substantially the entire piston movement and during the entire suction-stroke of the piston, so that the cylinder is fully filled with air of the normal pressure at which it is received. The exhaust-passage in the valve is so disposed with relation to the cylinder-port that it remains closed during such portion of the expelling movement of the piston as will allow the air upon that side of the piston to be compressed to a point equal to or greater than that of the receiver into which the air is to be forced before said valve is opened.

Having thus described my invention, what I claim, and desire to secure by Letters Patent, is—

1. The combination with a cylinder and a piston reciprocable therein, of a circular valve-seat, with ports communicating with the cylinder ends, a constantly-rotating circular disk valve fitting the seat and having ports adapted to register with those of the seat, a central tubular valve-stem communicating with the inlet-port, an exterior discharge-chamber, and means for constantly rotating the valve in unison with the reciprocations of the piston.

2. The combination with a reciprocating piston, a cylinder in which it operates, and a valve-casing, of a flat circular valve-seat having ports through opposite sides and communicating with the cylinder, a rotatable disk valve having a flat face fitting the valve-seat and revoluble thereon, said valve having ports adapted to register with those of said seats, a central, revoluble valve-stem connecting with the inlet-port of the valve, and means for constantly rotating the valve-disk in unison with the reciprocations of the piston, said valve-casing having a passage with which the outlet-port connects.

3. The combination with a reciprocating piston and the cylinder thereof, of a flat circular valve-seat having inlet and discharge ports at opposite sides of the center said ports connecting with the cylinder ends, a flat circular valve guided and fitting said seat, having ports in its face which register and coincide with those of the seat, a tubular revoluble valve-stem fixed to the valve and connecting with the inlet-port thereof, and means by which the valve is constantly rotated in unison with the reciprocations of the piston, to connect the ports of the valve with those of the valve-seat.

4. A cylinder, a piston reciprocating therein, a flat circular valve-seat with ports at opposite sides of the center, connecting with the cylinder ends, a guided revoluble valve fitting the seat, and having segmental peripheral ports which register with those of the seat, the valve inlet-port having such length that it remains fully open substantially during the entire stroke, and the outlet-port remaining closed to cause compression within the cylinder before said port is opened.

5. A cylinder and a piston reciprocating therein, a flat circular valve-seat having ports at opposite sides of the center connecting with the cylinder ends, a valve fitting and revoluble upon the seat, said valve having segmental peripheral ports, and inlet and outlet passages which are connected alternately with opposite ends of the cylinder by the rotation of the valve, said valve-ports having such relative length and position that the inlet-port remains full open substantially during the entire drawing in of the charge, and the exhaust-port remains closed until compression is produced within the cylinder.

6. A cylinder and a piston reciprocating therein, a flat circular valve-seat having ports at opposite sides of the center connecting with the cylinder ends, a valve fitting and revoluble upon the seat, and having peripheral inlet and outlet ports, said inlet-port being of such length as to remain in register with the corresponding cylinder-port during substantially the full stroke of the piston, and the exhaust-port so located with reference to the inlet, that it remains closed to insure compression within the cylinder before the opening of the exhaust.

7. A cylinder and a piston reciprocating therein, a flat circular valve-seat having ports at opposite sides of the center connecting with the cylinder ends, a valve fitting and revoluble upon the seat, and having peripheral inlet and outlet ports, a tubular shaft and inlet-passage connected with the inlet-port of the valve, a discharge-passage in the valve-chamber with which the exhaust-port connects, sprockets upon both valve-shaft and crank-shaft, and a chain through which motion is transmitted to rotate the valve in unison with the rotation of the crank-shaft.

8. A cylinder with a piston reciprocating therein, a flat circular valve-seat having ports on opposite sides connecting with the cylinder ends, a valve fitting and revoluble upon said seat, and having inlet and discharge ports which register alternately with the opposite cylinder-ports, a casing inclosing the valve and having a passage through which the discharge is effected, a tube connected centrally with the valve and opening into the inlet-port thereof, a stuffing-box in the casing through which the tube passes and by which it is guided, and means carried by the tube whereby it and the valve are rotated in unison with the reciprocations of the piston.

9. The combination with a cylinder and a reciprocating piston operating therein, and having inlet and discharge ports at opposite sides of the center, of a valve-gear mechanism including a circular valve-seat, a rotatable circular disk valve fitting said seat, a central tubular valve-stem, an exterior discharge-chamber, and means for constantly rotating the valve in unison with the reciprocations of the piston, said cylinder and valve having registering ports and said tubular valve-stem communicating with the inlet-port and said discharge-chamber connecting with the outlet-port.

10. In a machine of the character described, the combination of a cylinder having inlet and discharge ports connecting with the cylinder ends, a piston reciprocable between said ports, a valve-gear mechanism including a rotatable disk valve fitting flatwise against the cylinder, and means for constantly rotating the valve said valve having a tubular stem which connects with said inlet-port.

In witness whereof I have hereunto set my hand.

EDWARD A. RIX.

Witnesses:
S. H. NOURSE,
JESSIE C. BRODIE